United States Patent [19]

Hornack

[11] Patent Number: 6,039,996
[45] Date of Patent: Mar. 21, 2000

[54] ACID-NEUTRALIZING ADDITIVE FOR ROASTING COFFEE

[75] Inventor: Richard S. Hornack, Overland Park, Kans.

[73] Assignee: Chemcraft, Inc., Overland, Kans.

[21] Appl. No.: 09/062,270

[22] Filed: Apr. 17, 1998

Related U.S. Application Data

[60] Provisional application No. 60/044,389, Apr. 18, 1997.
[51] Int. Cl.[7] ................................ A23L 1/22; A23B 6/00; A23B 4/03; A23F 5/00
[52] U.S. Cl. ..................... 426/534; 426/507; 426/455; 426/442; 426/595
[58] Field of Search ..................... 426/595, 507, 426/455, 442, 629, 534

[56] References Cited

U.S. PATENT DOCUMENTS

| | | | |
|---|---|---|---|
| 1,822,227 | 9/1931 | Lendrich et al. | 426/507 |
| 2,419,031 | 4/1947 | Pollack | 426/595 |
| 2,824,805 | 2/1958 | Hale | 426/595 |
| 4,317,841 | 3/1982 | Brambilla et al. | 426/422 |

FOREIGN PATENT DOCUMENTS

| 58-111641 | 2/1983 | Japan | 426/595 |
|---|---|---|---|

*Primary Examiner*—Anthony J. Weier
*Attorney, Agent, or Firm*—Crowe & Dunlevy

[57] ABSTRACT

The present invention includes a process and composition for reducing acidity in beans. The composition of the present invention may be sprayed onto the beans, or alternatively, the beans may be dipped in the composition to effectively reduce the acidity therein. The composition is characterized by a solution containing from about 1 to 2 percent by weight of Phosphorous Pentoxide, from about 0.25 to about 2 percent by weight of a non-anionic surfactant, about five to about 40 percent by weight of a solution of about 45 percent potassium hydroxide, and from about 55 to about 80 percent by weight of deionized water.

2 Claims, No Drawings

ACID-NEUTRALIZING ADDITIVE FOR ROASTING COFFEE

RELATED APPLICATIONS

This application claims priority to U.S. Provisional Application Ser. No. 60/044,389 filed Apr. 18, 1997, hereby incorporated by reference.

BACKGROUND OF THE INVENTION

1. Field of the Invention

The present invention relates to additives which are applied to coffee beans to reduce the acid in the coffee beans.

2. Discussion of Prior Art

Many people are sensitive to the acid contained in coffee. The weak acid contained in the coffee is both distasteful and upsetting to their bodily systems. Many people suffer from conditions of high acidity in the body, such as ulcers, colitis, acidosis, gout and many other conditions. Some have been advised to avoid beverages of high acid content, such as tea and coffee.

Although the many varieties of flavored coffee that are available today serve to improve the taste characteristics of coffee, they do nothing to neutralize or reduce the acid therein. Thus, even though these varieties of flavored coffee taste better, they still can upset the systems of many persons.

By contrast, there are certain health benefits which may be realized by ingesting more alkaline drinks. Such benefits have been described in U.S. patent application Ser. No. 08/840,891 and in U.S. Pat. No. 5,306,511, issued to Whang.

Due to the popularity of coffee as one of the leading beverages in the U.S. and around the world, there is a need for a composition and process for treating coffee or coffee beans which neutralizes the acid therein.

SUMMARY OF THE INVENTION

The present invention provides a process and composition for reducing acidity in beans. The composition is characterized by a solution containing from about 1 to 2 percent by weight of Phosphorous Pentoxide, from about 0.25 to about 2 percent by weight of a non-anionic surfactant, about five to about 40 percent by weight of a solution of about 45 percent potassium hydroxide, and from about 55 to about 80 percent by weight of deionized water. The solution is then applied topically to the beans. Alternatively, the beans are dipped into the solution, allowing the solution to penetrate the hard outer shell of the beans and thereby increasing both the volume and the weight of the beans. Controlling the duration of the treatment of the beans to the solution and controlling the amount of dilution of the solution is the deionized water will have a direct impact on the pH of the treated beans such that a longer exposure will result in a higher pH. The added moisture within the beans due to the presence of the solution, extends the freshness of the beans. The beans are then dried to allow roasting to yield a fresher, smoother tasting, reduced acid coffee.

Other objects, features, and advantages of the present invention will become clear from the following description when read in conjunction with the appended claims.

DESCRIPTION OF THE INVENTION

The present invention is a method and composition for treating coffee to reduce the acidity thereof. The present invention can change the pH of the resultant beverage. Normally when measured coffee has a pH of 3.5 to 5.0. By using this invention, pH can be raised to any desirable pH for acid reduction without negatively affecting flavor.

The composition according to the present invention is illustrated in Table 1.

TABLE 1

| Component | Percent by Weight |
| --- | --- |
| Phosphorus Pentoxide, $P_2O_5$ | 1–2% |
| Surfactant, non-anionic | .25–2% |
| 45% KOH Solution | 5–40% |
| Deionized Water | 55–80% |

The composition of the present invention is produced by adding 1–2% by weight Phosphorus Pentoxide, 0.25–2% by weight non-anionic surfactant, 5 to 40% by weight of 45% KOH solution and 55 to 80% by weight deionized water.

During the roasting process, the coffee beans are dipped in a solution containing the claimed composition. Alternatively, such a solution can be sprayed onto the coffee beans. Coffee treated in this manner should have a 30 to 100 percent reduction in acid in both the coffee beans and the brewed coffee.

By controlling the time the coffee beans are dipped, or by controlling the amount of the inventive composition sprayed on the beans, the pH can be adjusted upward from the existing pH of the coffee bean by 0.5 to 8.0.

EXAMPLE

Beans that produce a coffee with a pH of 3.5 were dipped in the composition of the present invention for 30 seconds. The resultant beverage had a pH of 6.5. The flavor was unchanged, except that the resultant beverage had a much smoother flavor and less bite. Additionally, the process of the present invention creates a permanent pH adjustment on the coffee beans such that after a year, the task and freshness remained unchanged, without vacuum packing Additionally, it was noted during experimentation that the volume and weight of the coffee beans was increased upon treatment. In this particular experiment, the weight increased from 28 grams to 31.2 grams (about 12%). During years where coffee crops have been damaged by weather, this invention could increase volume and weight by an average of 10%. This is a significant advantage to the coffee roasting companies and consumers, as costs for coffee could be more easily stabilized.

An example of the present invention is apparent from an examination of Table 2.

TABLE 2

| Component | Amount |
| --- | --- |
| Phosphorus Pentaoxide, $P_2O_5$ | 5 lbs |
| Surfactant, non-anionic | ⅛ gal. |
| 45% KOH Solution | 2 ⅛ gal. |
| Deionized Water | 7 ¼ gal. |

The present invention is sprayed on coffee beans or the coffee beans may be dipped and dried prior to the roasting process to obtain the same effect during the roasting process to reduce the acid in the coffee beans and brewed coffee by from 30 to 100 percent.

The present invention as described in Table 2, can be diluted to control the amount of pH adjustment using demineralized or deionized water. The amount of time that the beans remain in contact with the bath is directly proportional to the pH of the beans whereby the longer the duration of contact the higher the pH of the beans.

The formula is prepared with a dilution of D/I water as described above. The diluted formula is placed into a shallow stainless steel container. The size of the container will be dependent upon the manufacturing operation. The movement of the beans through the dipping solution can be accomplished though a variety of methods, dispensing the manufacturing facility and equipment available. Beans move through the solution and then are dried. Beans treated in accordance with the present invention may either be green or roasted, and the volume and weight, as well as the acidity of the beans will increase regardless. Flavor will remain the same and a smoother taste will enhance the resultant beverage. Drying time is dependent upon drying method. Green beans may be immediately roasted without drying. One gallon of formula mixed with DI water in a solution bath may be used to treat up to 50 pounds of coffee beans.

The formula is prepared with a diluting solution of either deionized water or deionized water and liquid flavoring. One gallon of the formula is blended with 5 to 20 gallon of the diluting solution. The mixture is placed into a spray apparatus and sprayed onto 50 pounds of beans. The dilution rate can be adjusted to affect the desired pH and flavor requirements.

The starting pH of the beverages is determined prior to determining application dilution rates and timing by brewing coffee in deionized or demineralized water and measuring the pH of the brewed coffee. The dilution rate and times are determined based on this starting pH, the pH objective, and, if flavoring is involved, the directions of the flavoring manufacturer.

As an example, assume one has coffee beans that produce a beverage with a pH of 4.5, and it is desired to have a resultant beverage pH of 6.0. A solution is prepared of one gallon of formula as described in Table 2 to five gallons deionized water can significantly change the pH of the resulting beverage. The resultant solution is placed into a spray apparatus and sprayed on 50 pounds of green or roasted beans, yielding a beverage with a pH of 5.8 to 6.2.

Alternatively, if the coffee beans are dipped in the solution instead of sprayed, a ratio of one gallon of formula as described in Table 2 to 1 gallon of water, should be used to yield a resultant bath solution of about two gallons. The bath solution is placed into a stainless steel shallow container and the beans are placed in a mesh/screen basket, enclosed on all sides. The beans are dipped in the bath for 18–22 seconds. The resultant beverage will have a pH of from 5.8 to 6.2.

As another example, to achieve a resultant beverage pH of 6.0 with coffee flavor, on beans that produce a beverage with a pH of 4.5 before flavoring, a flavor solution is prepared as described by the flavor manufacturer. One gallon of the solution of the present invention as described in Table 2 is added to five gallons of the prepared flavoring for every 50 pounds of coffee. The resultant beverage pH will range from 6.0 to 6.5.

The present invention penetrates the hard outer shell of the bean. When this occurs a portion of the solution bath or spray remains in the bean. This results in an increase in volume and weight. The penetration also causes moisture, namely the water and inventive formula, to be retained within the bean. This moisture retention extends the freshness of the bean over a prolonged period of time.

The present invention provides an improved coffee or other acidic beverage for health and flavor by penetrating the outer shell of the coffee bean to break the bonds of acid which may be harmful inside the bean. Furthermore, the present invention extends the freshness of the coffee bean while increasing both the volume and weight of the coffee bean. By controlling the duration and dilution rate of the composition of the present invention on coffee beans, the pH levels may also be effectively controlled.

It is clear that the present invention is well adapted to carry out the objects and to obtain the ends and advantages mentioned as well as those inherent therein. While a presently preferred embodiment of the invention has been described for purposes of this disclosure, it will be recognized that numerous changes may be made which will readily suggest themselves to those skilled in the art and which are encompassed within the spirit of the invention disclosed.

What is claimed is:

1. A process for reducing acidity in beans comprising contacting the beans with a solution comprising from about 1 to 2 percent Phosphorus Pentoxide, from about 0.25 to about 2 percent non-anionic surfactant, about five to about 40 percent of a solution of about 45 percent potassium hydroxide, and from about 55 to about 80 percent deionized water.

2. A composition for treating beans comprising:
   1 to 2 percent by weight of a Phosphorous Pentoxide;
   0.25 to 2 percent by weight of a non-anionic surfactant;
   5 to 40 percent by weight of a solution of 45 percent potassium hydroxide; and
   55 to about 80 percent by weight of deionized water.

* * * * *

UNITED STATES PATENT AND TRADEMARK OFFICE
CERTIFICATE OF CORRECTION

Page 1 of 1

PATENT NO. : 6,039,996
DATED : March 21, 2000
INVENTOR(S) : Richard S. Hornack

It is certified that error appears in the above-identified patent and that said Letters Patent is hereby corrected as shown below:

Column 2,
Line 37, replace "packing Additionally," with -- packing. Additionally, --.
Line 54, replace "Pentaoxide" with -- Pentoxide --.

Column 3,
Line 21, replace "5 to 20 gallon" with -- 5 to 20 gallons --.

Signed and Sealed this

Thirtieth Day of April, 2002

*Attest:*

*Attesting Officer*

JAMES E. ROGAN
*Director of the United States Patent and Trademark Office*